US009122133B2

(12) United States Patent
Bennett et al.

(10) Patent No.: US 9,122,133 B2
(45) Date of Patent: Sep. 1, 2015

(54) CAMERA MOUNT FOR SPORTS BOARD (71) Applicant: GoPro, Inc., San Mateo, CA (US)

(72) Inventors: Eric Bennett, Foster City, CA (US);
Rudy Lucas Samuels, Mill Valley, CA (US)

(73) Assignee: GoPro, Inc., San Mateo, CA (US)

( * ) Notice: Subject to any disclaimer, the term of this patent is extended or adjusted under 35 U.S.C. 154(b) by 0 days.

(21) Appl. No.: 14/495,673

(22) Filed: Sep. 24, 2014

(65) Prior Publication Data

US 2015/0192841 A1    Jul. 9, 2015

Related U.S. Application Data

(63) Continuation of application No. 14/149,502, filed on Jan. 7, 2014, now Pat. No. 8,870,475.

(51) Int. Cl.
*G03B 17/00* (2006.01)
*G03B 17/56* (2006.01)
*H04N 5/225* (2006.01)

(52) U.S. Cl.
CPC ............ *G03B 17/561* (2013.01); *H04N 5/2253* (2013.01)

(58) Field of Classification Search
USPC .................. 396/419, 429; 411/340–346, 549; 441/65, 71, 88
See application file for complete search history.

(56) References Cited

U.S. PATENT DOCUMENTS

| 5,244,326 | A  | * | 9/1993 | Henriksen | ...................... 411/180 |
| 5,429,466 | A  | * | 7/1995 | Nagayama | ..................... 411/179 |
| 7,226,261 | B1 |   | 6/2007 | Bristol |  |
| 7,674,081 | B2 | * | 3/2010 | Selle | .............................. 411/179 |
| 8,014,656 | B2 | * | 9/2011 | Woodman | ....................... 396/25 |
| 8,235,635 | B1 |   | 8/2012 | Brown et al. |  |
| 8,485,910 | B2 | * | 7/2013 | Selle | ................................. 470/5 |

OTHER PUBLICATIONS

United States Office Action for U.S. Appl. No. 14/149,502, Jul. 9, 2014, 8 pages.

* cited by examiner

*Primary Examiner* — Minh Phan
(74) *Attorney, Agent, or Firm* — Fenwick & West LLP

(57) ABSTRACT

A camera system is configured to detachably couple to a camera mount, which in turn can be attached to an apparatus such as a sports board. The camera mount includes a top mount portion and a bottom screw portion. The top mount portion includes a buckle component that can detachably couple to a camera system, and includes blade components having cutting edges that can cut through a sports board. The blade components surround a screw hole component, and when the blade components have pierced a surface of the sports board and cut through the board, an opening to the screw hole component is accessible from the underside of the board surface. The bottom screw portion includes a screw thread that can be inserted and screwed into the screw hole component, thus securing the camera mount to the sports board.

19 Claims, 8 Drawing Sheets

CAMERA MOUNT FOR SPORTS BOARD

CROSS-REFERENCE TO RELATED APPLICATIONS

This application is a continuation of U.S. application Ser. No. 14/149,502, filed Jan. 7, 2014, (allowed), which is hereby incorporated by reference in its entirety.

BACKGROUND

1. Technical Field

This disclosure relates to a camera system, and more specifically, to a camera mount meant to secure a camera system to a sports board.

2. Description of the Related Art

Digital cameras are increasingly used in outdoors and sports environments. In order to allow for the safe use of cameras in such environments, the cameras need to be secured to camera mounts, which in turn can be secured to, for example, sports equipment, vehicles, or a user. One such means for securing a camera to a camera mount is a camera housing that securely encloses or partially encloses a camera, and couples to a camera mount. A user experience with a camera mount can be diminished by difficult or inefficient mechanisms for securing and releasing the camera mount to an apparatus.

BRIEF DESCRIPTIONS OF THE DRAWINGS

The disclosed embodiments have other advantages and features which will be more readily apparent from the following detailed description of the invention and the appended claims, when taken in conjunction with the accompanying drawings, in which:

Figure (or "Fig.") 1a illustrates a perspective view of a camera system, according to one embodiment.

DETAILED DESCRIPTION

The figures and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Example Camera System Configuration

A camera system includes a camera and a camera housing structured to at least partially enclose the camera. The camera comprises a camera body having a camera lens structured on a front surface of the camera body, various indicators on the front of the surface of the camera body (such as LEDs, displays, and the like), various input mechanisms (such as buttons, switches, and touch-screen mechanisms), and electronics (e.g., imaging electronics, power electronics, etc.) internal to the camera body for capturing images via the camera lens and/or performing other functions. The camera housing includes a lens window structured on the front surface of the camera housing and configured to substantially align with the camera lens, and one or more indicator windows structured on the front surface of the camera housing and configured to substantially align with the camera indicators.

Figure 1A:
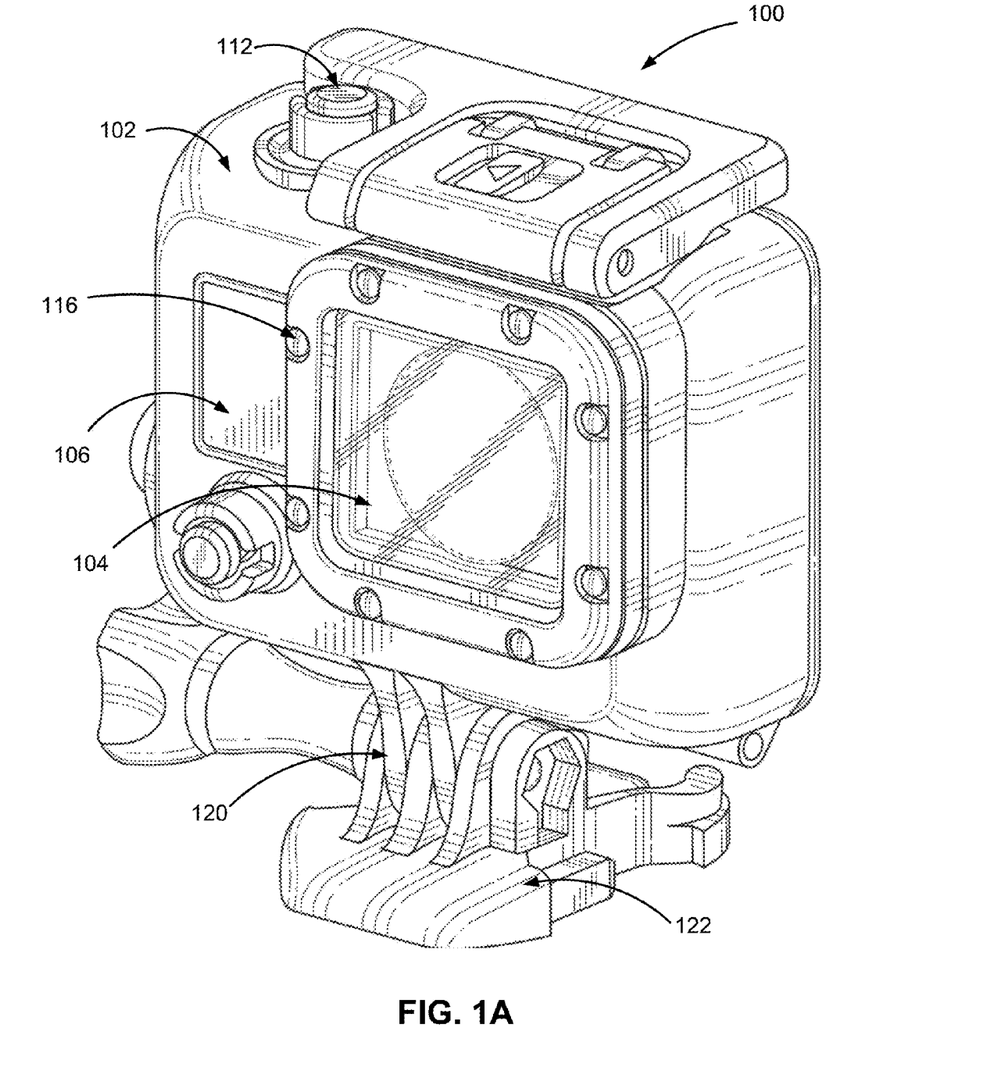
Figure 1B:
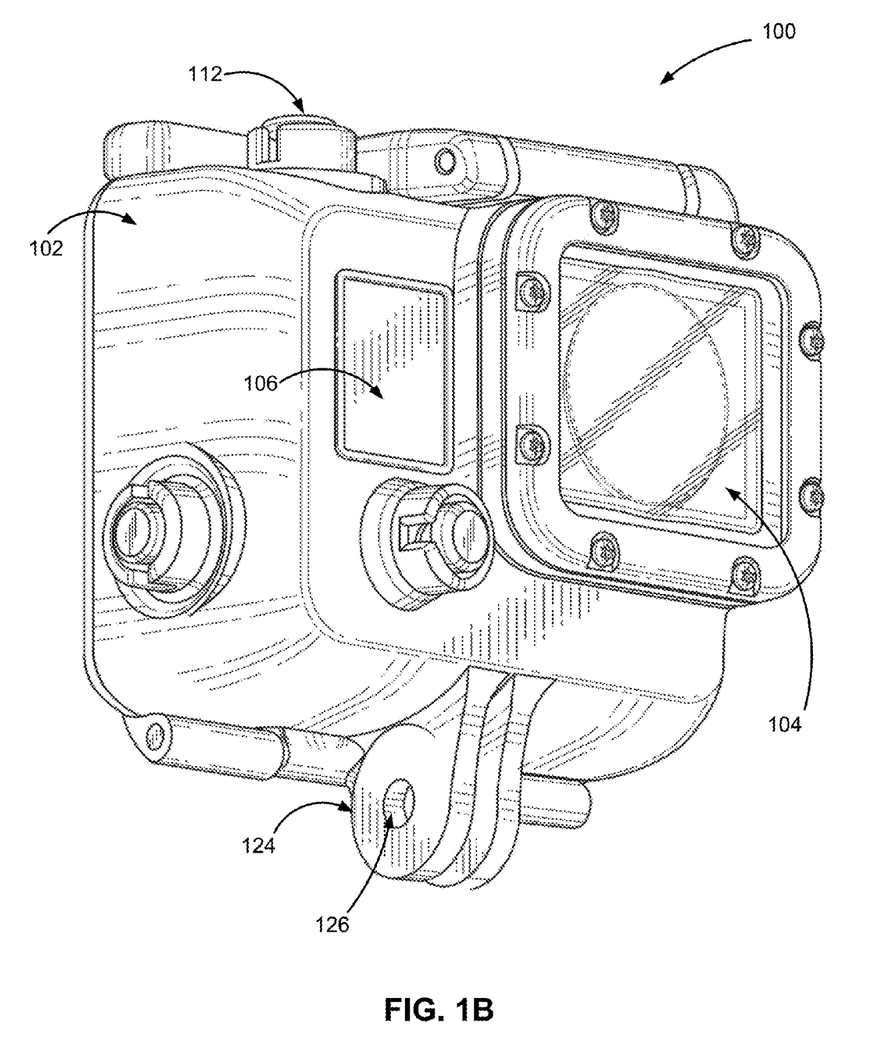
FIG. 1b illustrates another alternative perspective view of a camera system, according to one embodiment.

FIGS. 1a and 1b illustrate various views of a camera system according to one example embodiment. The camera system includes, among other components, a camera housing 100. In one embodiment, a first housing portion 102 includes a front face with four sides (i.e., a top side, bottom side, left side, and right side) structured to form a cavity that receives a camera (e.g. a still camera or video camera). In other embodiments, the camera housing 100 may not include one or more sides or faces. For instance, the camera housing 100 may not include a front or back face, allowing the front face and rear face of the camera to be exposed when partially enclosed by the top side, bottom side, left side, and right side of the camera housing 100.

In one embodiment, the camera housing 100 has a small form factor (e.g., a height of approximately 3 to 6 centimeters, a width of approximately 3 to 7 centimeters, and a depth of approximately 1 to 4 centimeters), and is lightweight (e.g., approximately 50 to 150 grams). The camera housing 100 can be rigid (or substantially rigid) (e.g., plastic, metal, fiberglass, etc.) or pliable (or substantially pliable) (e.g., leather, vinyl, neoprene, etc.). In one embodiment, the camera housing 100 may be appropriately configured for use in various elements. For example, the camera housing 100 may comprise a waterproof enclosure that protects a camera from water when used, for example, while surfing or scuba diving.

Portions of the camera housing 100 may include exposed areas to allow a user to manipulate buttons on the camera that are associated with the camera functionality. Alternatively, such areas may be covered with a pliable material to allow the user to manipulate the buttons through the camera housing 100. For example, in one embodiment the top face of the camera housing 100 includes an outer shutter button 112 structured so that a shutter button 112 of the camera is substantially aligned with the outer shutter button 112 when the camera is secured within the camera housing 100. The shutter button 112 of the camera is operationally coupled to the outer shutter button 112 so that pressing the outer shutter button 112 allows the user to operate the camera shutter button.

In one embodiment, the front face of the camera housing 100 includes a lens window 104 structured so that a lens of the camera is substantially aligned with the lens windows 104 when the camera is secured within the camera housing 100.

The lens window 104 can be adapted for use with a conventional lens, a wide angle lens, a flat lens, or any other specialized camera lens. In this embodiment, the lens window 104 comprises a waterproof seal so as to maintain the waterproof aspect of the housing 100.

In one embodiment, the camera housing 100 includes one or more securing structures 120 for securing the camera housing 100 to one of a variety of mounting devices. For example, FIG. 1a illustrates the camera housing secured to a clip-style mount 122. In this example, the camera housing 100 includes a first plurality of protrusions (protrusions 124 as shown in FIG. 1b), and the mount 122 includes a second plurality of protrusions. Each protrusion includes a hole (hole 126 as shown in FIG. 1b) at a similar location within the protrusion such that the first and second pluralities of protrusions can interlock in such a way that the protrusion holes substantially align. Continuing with this example, a turnable handscrew is inserted through the aligned holes, coupling the camera housing 100 to the mount 122 such that the camera housing can pivotally rotate relative to the mount when the turnable handscrew is in a first unlocked position, and such that the camera housing is fixed in position relative to the mount when the turnable handscrew is in a second locked position. In other embodiments, the camera housing 100 can be secured to a different type of mounting structure, and can be secured to a mounting structure via a different type of coupling mechanism.

In one embodiment, the camera housing 100 includes an indicator window 106 structured so that one or more camera indicators are substantially aligned with the indicator window 106 when the camera is secured within the camera housing 100. The indicator window 106 can be any shape or size, and can be made of the same material as the remainder of the camera housing 100, or can be made of any other material, for instance a transparent or translucent material and/or a non-reflective material.

The described housing 100 may also be adapted for a wider range of devices of varying shapes, sizes and dimensions besides cameras. For example, an expansion module may be attached to housing 100 to add expanded features to electronic devices such as cell phones, music players, personal digital assistants ("PDAs"), global positioning system ("GPS") units, or other portable electronic devices.

Figure 1C:
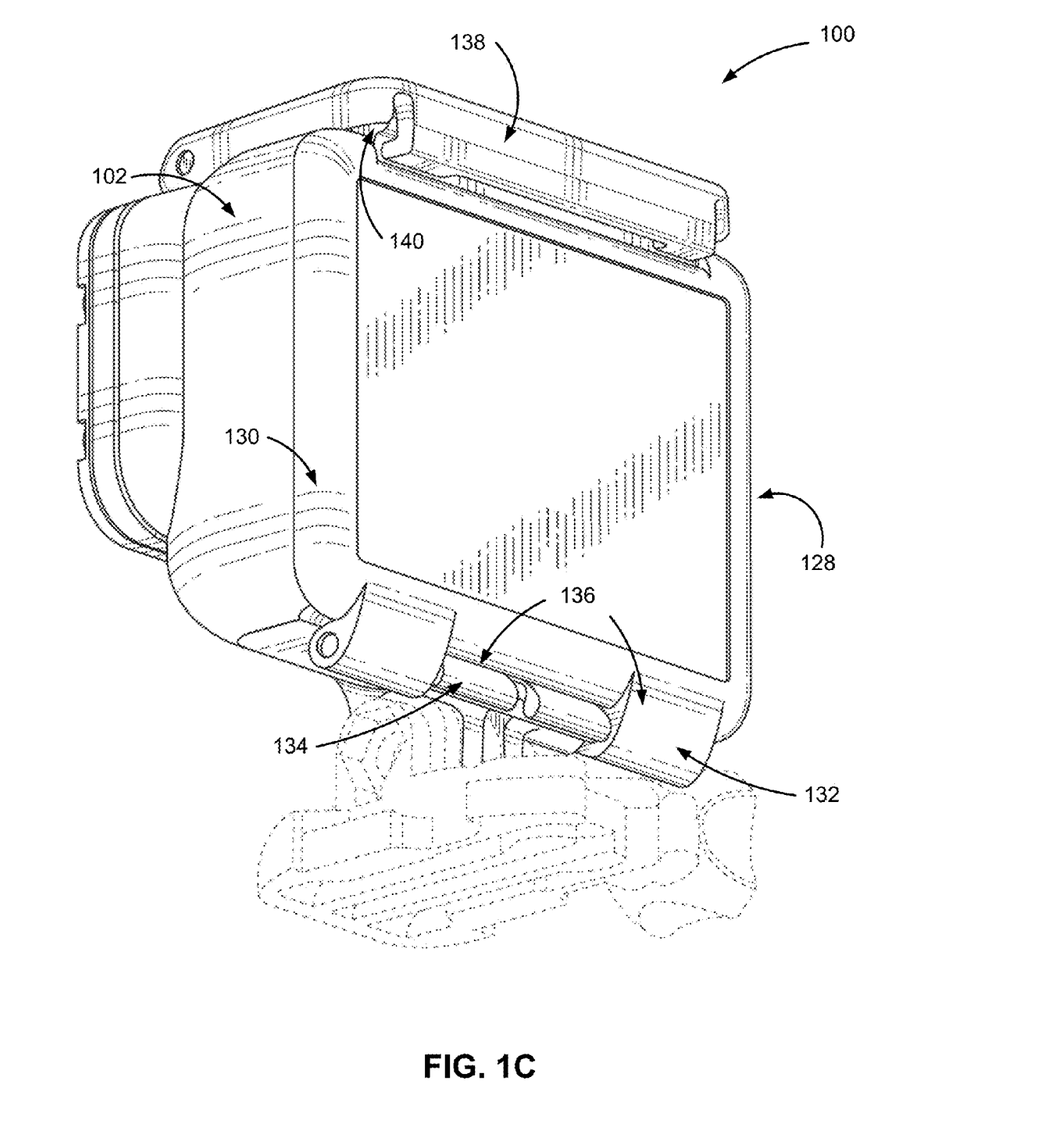
FIG. 1c illustrates a perspective view of a rear of the camera system, according to one embodiment.

FIG. 1c is a rear perspective view of camera housing 100 illustrating a second housing portion 128, according to one example embodiment. The second housing portion 128 detachably couples with the first housing portion 102 opposite the front face of the first housing portion. The first housing portion 102 and second housing portion 128 are collectively structured to enclose a camera within the cavity when the second housing portion 128 is secured to the first housing portion 102 in a closed position.

In one embodiment, the second housing portion 128 comprises a door 130 that allows the camera to be removed from the housing 100. The door 130 pivots around a hinge 136 that allows the door 130 to be opened or shut. In one embodiment, a first fastening structure 138 located on the top face of the camera housing 100 detachably couples to a second fastening structure 140 on the door 130. The fastening structures 138, 140 secure the door 130 to the first portion 102 of the camera housing 100 in a closed position when coupled, as illustrated in FIG. 2. In one embodiment, the fastening structure 138 comprises a hook-shaped lateral bar and the fastening structure 140 comprises an L-shaped bar. The fastening structure 138 can pivot upwards to allow the door 130 to close and can then be pressed down around the fastening structure 140 to hold the door 130 in the closed position. In different embodiments, fastening structures for securing the door 130 can include, for example, a button assembly, a buckle assembly, a clip assembly, a hook and loop assembly, a magnet assembly, a ball and catch assembly, and an adhesive assembly, or any other type of securing mechanism.

In one alternative embodiment, the hinge 136 is instead located on the top face of the housing 100 and the fastening structures 138, 140 are instead located on the bottom face of the housing 100. Alternatively, the hinge 136 and fastening structures 138, 140 may be located on opposite side faces of the camera housing 100.

In one embodiment, the housing 100 includes a watertight seal so that the housing 100 is waterproof when the door 130 is shut. For example, in one embodiment, the door 130 includes a sealing structure positioned on interior edges of the door 130. The sealing structure provides a watertight seal between the first portion of the camera housing 102 and the door 130 when the first securing structure 138 on the top face of the camera housing 100 is coupled to the second securing structure 140 on the top edge of the door 130.

In one embodiment, an outer hinge structure 132 on the bottom edge of the second housing portion 128 detachably couples to an inner hinge structure 134 on the bottom edge of the first housing portion 102 to form the hinge 136. For example, in one embodiment, the outer hinge structure 132 comprises one or more hook-shaped protrusions structured to securely fasten to a rod-shaped member of the inner hinge structure 134. Other mechanisms for coupling the second housing portion 128 to the housing 100 may also be used in various alternative embodiments. In other embodiments, the second housing portion 128 may be permanently attached to the first housing portion 102.

Figure 2A:
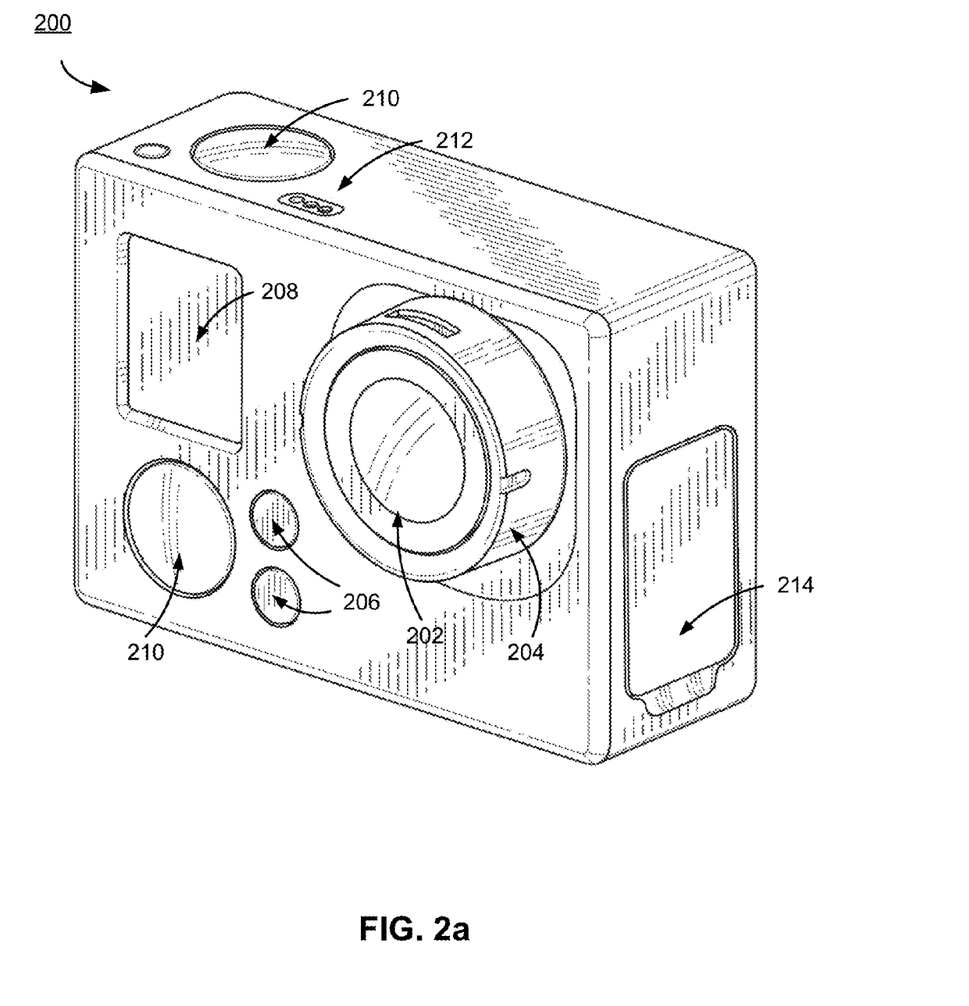
FIG. 2a illustrates a perspective view of a camera for use with the camera system, according to one embodiment.

FIG. 2a illustrates a camera 200 for use with the camera systems described herein, according to one example embodiment. The camera 200 is configured to capture images and video, and to store captured images and video for subsequent display or playback. The camera 200 is adapted to fit within a camera housing, such as the housing 100 discussed above or any other housing described herein. As illustrated, the camera 200 includes a lens 202 configured to receive light incident upon the lens and to direct received light onto an image sensor internal to the lens. The lens 202 is enclosed by a lens ring 204.

The camera 200 can include various indicators, including the LED lights 206 and the LED display 208 shown in FIG. 2a. When the camera 200 is enclosed within the housing 100, the LED display 208 is configured to substantially align with the indicator window 106, and the LED lights 206 are configured to be visible through the housing 100. The camera 200 can also include buttons 210 configured to allow a user of the camera to interact with the camera, to turn the camera on, and to otherwise configure the operating mode of the camera. The camera 200 can also include a microphone 212 configured to receive and record audio signals in conjunction with recording video. The side of the camera 200 includes an I/O interface 214. Though the embodiment of FIG. 2a illustrates the I/O interface 214 enclosed by a protective door, the I/O interface can include any type or number of I/O ports or mechanisms, such as universal serial bus (USB) ports, HDMI ports, memory card slots, and the like.

Figure 2B:
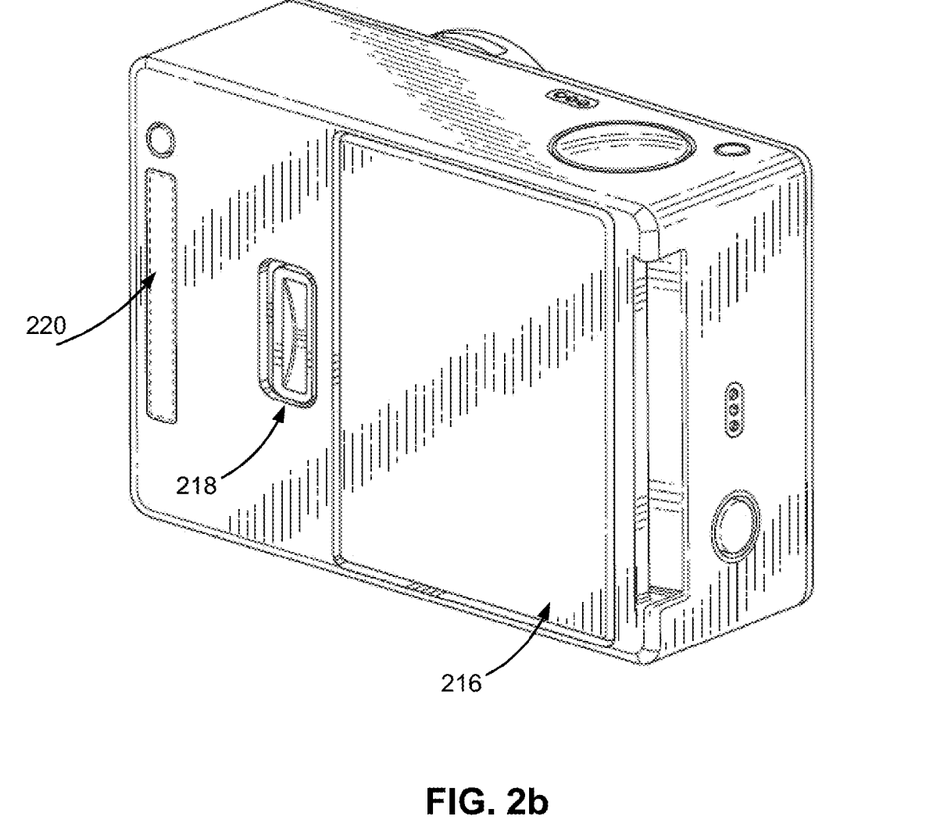
FIG. 2b illustrates a perspective view of a rear of a camera for use with the camera system, according to one embodiment.

FIG. 2b illustrates a perspective view of a rear of a camera 200 for use with the camera system, according to one embodiment. The camera 200 includes a door 216 that covers a removable battery and battery interface. The door 216 can be removed via the door release mechanism 218. The camera also includes an expansion pack interface 220 configured to receive a removable expansion pack, such as a display module, an extra battery module, a wireless module, and the like. Removable expansion packs, when coupled to the camera 200, provide additional functionality to the camera via the expansion pack interface 220.

Camera Mount for a Sports Board

Figure 3:
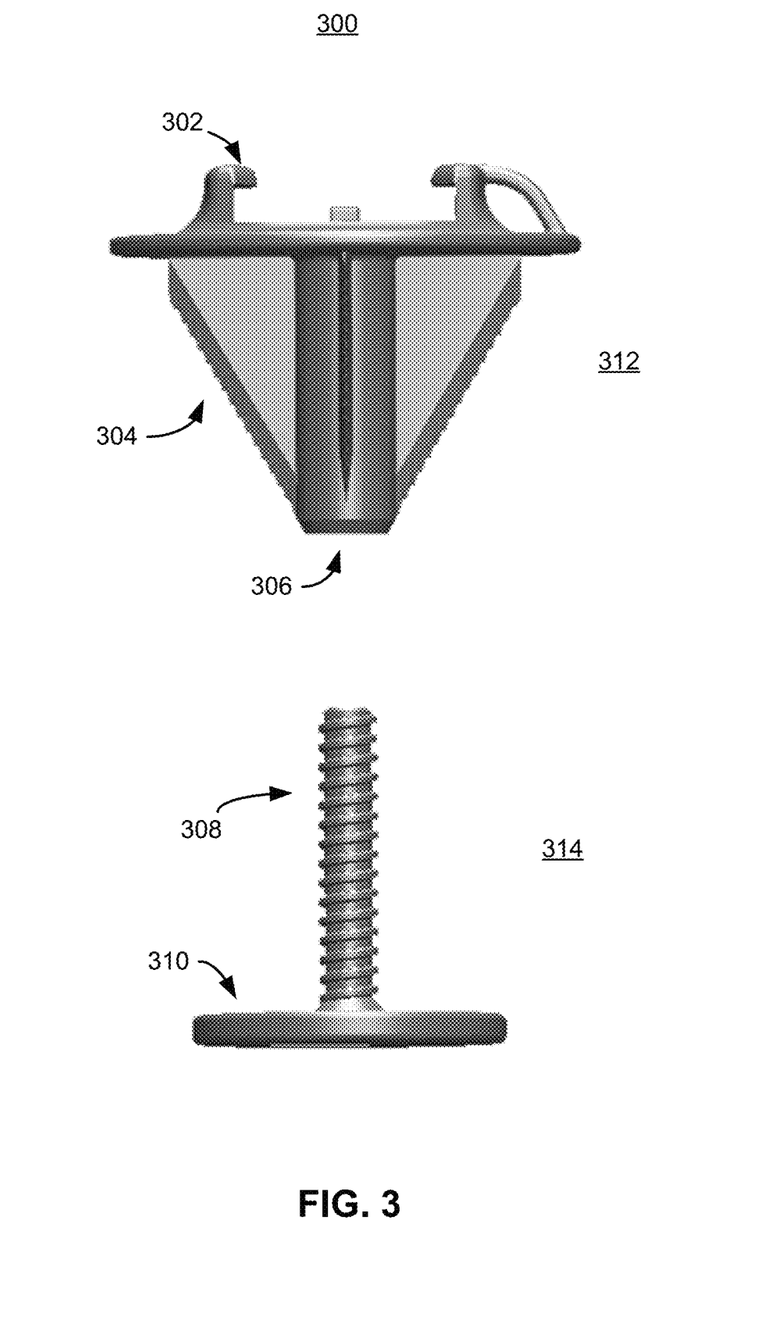
FIG. 3 illustrates a side view of a mounting system meant to secure a camera housing to a sports board, according to one embodiment.

A camera mounting system is used to secure a camera system to an apparatus. To fasten the camera system to the apparatus, a camera system (a camera housing 100 containing a camera) is detachably secured to a mount, and the mount is detachably secured to the apparatus. FIG. 3 illustrates a camera mount 300 meant to secure a camera housing 100 to a sports board, according to one embodiment. In a separate embodiment, the camera mount 300 can secure a different object (such as a leash) to the sports board instead of or in addition to the camera housing 100. The sports board may be any type of board, including a wakeboard, boogie board, body board, or soft surfboard. The sports board can be made of a foam material or any other soft or malleable material. Alternatively, the camera mount 300 may secure a camera housing 100 to any soft foam structure or malleable material. The camera mount 300 can be made from any material, such as plastic or metal.

The camera mount 300 includes, among other components, a top mount portion 312 and a bottom screw portion 314. The top mount portion 312 includes a buckle component 302, a plurality of blade components 304, and a screw hole component 306. The buckle component 302 is configured to detachably couple to a camera system, and the blade components 304 are configured to forcibly cut through a sports board. The top mount portion 312 is structured such that when the blade components 304 have pierced a first surface of the sports board and subsequently cut through the board, the opening of the screw hole component 306 will be accessible on the opposite surface (or underside) of the board. The bottom screw portion 314 includes a screw head component 310 and a screw thread component 308 that is configured to be inserted into the screw hole component 306 of the top mount portion 312. The camera mount 300 is secured to the sports board when the top mount portion 312 is inserted into a first side of the sports board body and the screw thread component 308 of the bottom screw portion is inserted into an opposite side of the sports board body and screwed into the screw hole component 306 of the top mount portion, coupling the top mount portion to the bottom screw portion.

Figure 4A:
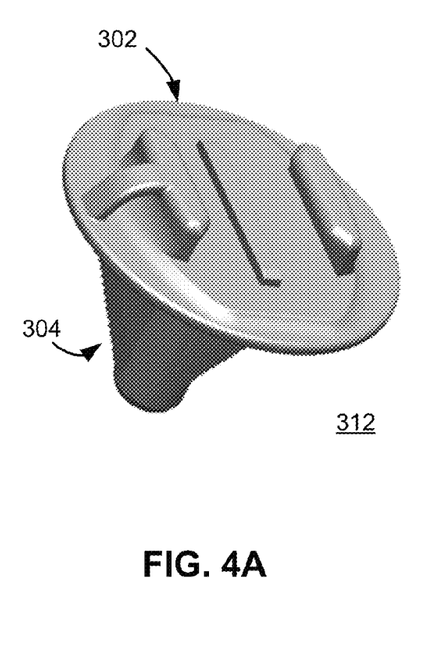
FIGS. 4A-4C illustrate three distinct views of a top mount portion of a mounting system for a camera system, according to one embodiment.
Figure 4B:
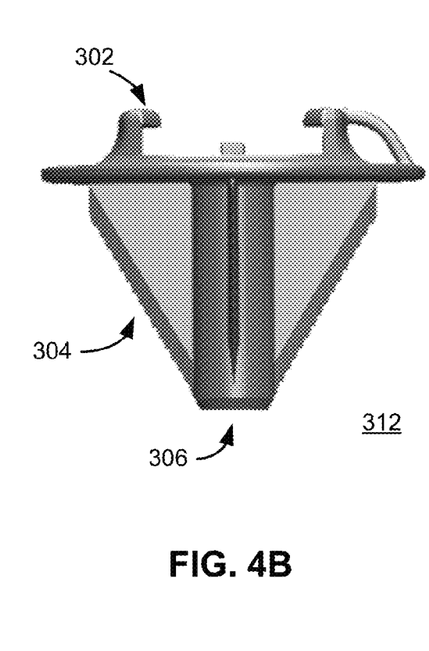
Figure 4C:
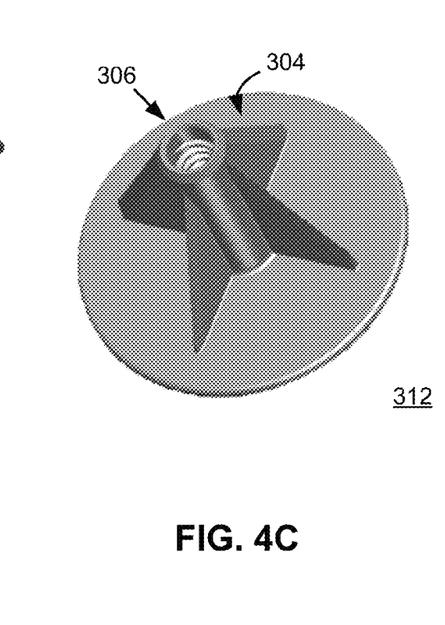

FIGS. 4A-4C illustrate three distinct views of the top mount portion 312 of a mounting system for a camera system, according to one embodiment. FIG. 4A highlights the buckle component 302 of the top mount portion 312, according to one embodiment. In an embodiment, a buckle component on the camera housing 100 (such as the clip-style mount 122 of FIG. 1) may be detachably secured to the buckle component 302 of the top mount portion 312 to fasten the camera housing 100 to the top mount portion 312. The camera housing 100 can include a female buckle component while the top mount portion 312 includes a male buckle component, and vice versa. The top mount portion 312 is configured so that the buckle component 302 is secured on a first surface of a sports board when the camera mount 300 is properly secured to the sports board.

FIGS. 4B and 4C highlight the blade components 304 of the top mount portion 312, structured on the underside of the surface of the buckle component 302, according to one embodiment. FIG. 4C illustrates one embodiment with four blade components. However, in other embodiments, there can be two, three, five, six, or any number of blade components 304. The blade components 304 surround and protrude outward from the edge/circumference of the cylindrical screw hole component 306. In some embodiments, the blade components 304 are located equiangular to each other around the edge of the screw hole component 306. This beneficially prevents the camera mount 300 from rotating when secured to the sports board. In an embodiment, each blade spans from a top edge of the top mount portion 312 (or from the underside of the surface of the buckle component 302) to an apex point at a bottom edge of the top mount portion 312 (or at the opening of the screw hole component 306). The edges of the blade components 304 meet at this apex point.

In the embodiment illustrated in FIG. 4, the four blade components 304 are located at 90 degree angles to each other. Each blade component contains a relatively sharp cutting edge that is sufficiently sharp to cut through a sports board or any foam or malleable material. The blade components may have straight edges or serrated edges. The structure of the edges allows for the blade components to slice or saw through, for example, a malleable board. In one embodiment, a user places the top mount portion 312 on a sports board surface, blade-side down, and puts pressure on the top mount portion 312, causing the blade components 304 to pierce the surface of the sports board and cut through to the opposite surface (underside) of the sports board.

In an embodiment, at least one of the blade components 304 is located higher along the lengthwise axis of the screw hole component 306 (closer to the opening of the screw hole component) than at least one other of the blade components 304, such that at least two of the blade components 304 are offset from each other along the screw hole component's lengthwise axis. Thus, when pressure is placed on the top mount portion 312 on a sports board, the at least one blade component 304 that is located higher along the screw hole component's lengthwise axis will pierce the surface of the board before the at least one other of the blade components 304. This reduces the amount of pressure required to pierce the board surface. In another embodiment, at least one of the blade components 304 has a greater length than the other blade components 304. In still another embodiment, the blade components 304 are all the same length and located at the same point along the lengthwise axis of the screw hole component 306.

FIGS. 4B and 4C highlight the screw hole component 306 of the top mount portion 312, structured on the underside of the buckle component 302, according to one embodiment. The screw hole component 306 is generally cylindrical and includes screw threading on the inside surface of the screw hole. Accordingly, the screw hole component 306 is configured to receive and couple to a threaded screw, such as the screw thread component 308. When the blade components 304 have pierced a first surface of the sports board and subsequently cut through the board, the opening of the screw hole component 306 will be accessible on the opposite surface (or underside) of the first surface, and a screw thread component 308 can be inserted into the screw hole component.

Figure 5:
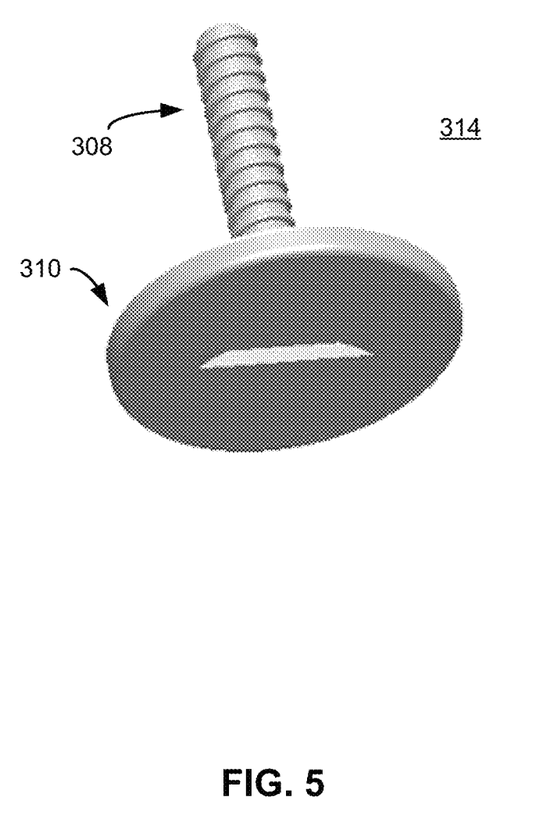
FIG. 5 illustrates a perspective view of a bottom screw portion of a mounting system for a camera system, according to one embodiment.

FIG. 5 illustrates a perspective view of a bottom screw portion 314 of the mounting system for a camera system, according to one embodiment. In an embodiment, the bottom screw portion 314 includes a screw thread component 308 and a screw head component 310. The screw thread component 308 is a threaded screw and is configured to be inserted and screwed into the screw hole component 306 of the top mount portion 312. The screw head component 310 is on a surface of the bottom screw portion 314, and the screw thread component 308 is located on an underside of this surface. In an embodiment, the screw head component 310 includes a slotted indentation for receiving a screwdriver.

In an example use scenario, a user places the top mount portion 312 blade-side downward on a sports board such as a boogie board. Next, the user places pressure on the top mount portion 312, causing the blade components 304 to pierce one surface of the boogie board and cut through to the opposite surface (underside) of the boogie board. The opening of the screw hole component 306 is accessible from the underside of the boogie board, and the user inserts the screw thread 308 of the bottom screw portion 314 into the screw hole component 306, securing the top mount portion 312 to the bottom screw portion. The user then mounts a camera system including a camera and camera housing to the buckle component 302 of the top mount portion 312 to secure the camera system to the camera mount 300.

Additional Configuration Considerations

Throughout this specification, some embodiments have used the expression "coupled" along with its derivatives. The term "coupled" as used herein is not necessarily limited to two or more elements being in direct physical or electrical contact. Rather, the term "coupled" may also encompass two or more elements are not in direct contact with each other, but yet still co-operate or interact with each other, or are structured to provide a thermal conduction path between the elements.

Likewise, as used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus.

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Finally, as used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Upon reading this disclosure, those of skill in the art will appreciate still additional alternative structural and functional designs as disclosed from the principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A mounting system comprising:
    a top mount portion configured to detachably couple to an electronic device, the top mount portion comprising:
        a screw hole component configured to receive a threaded screw, the screw hole component protruding perpendicularly outwards from a surface of the top mount portion; and
        a plurality of blade components each comprising a base portion protruding perpendicularly outwards from both the screw hole component and the surface of the top mount portion and an edge portion coupled to the base portion and protruding perpendicularly outwards from the screw hole component, each base portion comprising a first face and a second face, the first face parallel to the second face, and the plurality of blade components configured to cut through a sports equipment object, wherein the base portion is in direct contact with both the screw hole component and the surface of the top mount portion.

2. The mounting system of claim 1, wherein the sports equipment object is a sports board.

3. The mounting system of claim 2, wherein the sports board is a soft surfboard.

4. The mounting system of claim 2, wherein the sports board is a boogie board.

5. The mounting system of claim 1, wherein the electronic device is a camera.

6. The mounting system of claim 1, wherein the threaded screw is configured to be inserted into the screw hole component to securably couple the threaded screw to the top mount portion.

7. The mounting system of claim 6, the threaded screw comprising a screw head component and a screw thread component, wherein the screw thread component is located on a surface of the screw head component.

8. The mounting system of claim 7, wherein the screw head component comprises a slotted indentation configured to receive a screwdriver tip.

9. The mounting system of claim 1, wherein at least one of the edge portions of the plurality of blade components comprises a serrated edge.

10. The mounting system of claim 1, wherein at least one of the edge portions of the plurality of blade components comprises a straight edge.

11. The mounting system of claim 1, wherein the plurality of blade components are equally spaced around the screw hole component.

12. The mounting system of claim 1, wherein four blade components surround the screw hole component, each blade component located at a ninety degree angle from another blade component.

13. The mounting system of claim 12, wherein two of the blade components are located at a different location lengthwise along the screw hole component than the other two of the blade components.

14. The mounting system of claim 1, wherein at least one of the plurality of blade components is located at a different location lengthwise along the screw hole component than at least one other of the plurality of blade components.

15. The mounting system of claim 1, wherein at least one of the plurality of blade components has a greater length than at least one other of the plurality of blade components.

16. A mounting system for coupling an electronic device to sports equipment, comprising:
    a base;
    means for coupling to the electronic device on a first side of the base;
    a cylinder protruding perpendicularly outwards from a second side of the base, the cylinder comprising a screw hole configured to receive a screw; and
    a plurality of blades each comprising a blade base in contact with and protruding perpendicularly outwards from both the cylinder and the second side of the base and a blade edge coupled to the blade base and protruding perpendicularly outwards from the cylinder, each blade base comprising a first face and a second face, the first face parallel to the second face, wherein the blade base is in direct contact with the cylinder and the second side of the base.

17. The mounting system of claim 16, wherein the plurality of blades are equally spaced around the cylinder.

18. A mount for coupling an electronic device to a sports board, the mount including a plurality of blades each comprising a base protruding perpendicularly outwards from both a surface of the mount and a cylinder protruding from the surface of the mount and edge coupled to the base and protruding perpendicularly outwards from the cylinder, each base comprising a first face and a second face, the first face parallel to the second face, the cylinder configured to receive a threaded screw to couple the sports board between the mount and the threaded screw, the plurality of blades configured to cut into a surface of the sports board when the surface of the mount is facing the surface of the sports board and when pressure is applied on the mount in the direction of the sports board, wherein the base is in direct contact with the cylinder and the surface of the mount, the mount further comprising means for coupling the electronic device to a second surface of the mount.

19. The mount of claim 18, wherein the plurality of blades are equally spaced around the cylinder.

* * * * *